(12) United States Patent
Chen

(10) Patent No.: US 10,867,199 B2
(45) Date of Patent: Dec. 15, 2020

(54) DATA UPDATE METHOD FOR FACE-TO-UNLOCK AUTHENTICATION, AUTHENTICATION DEVICE, AND NON-VOLATILE STORAGE MEDIUM

(71) Applicants: BEIJING KUANGSHI TECHNOLOGY CO., LTD., Beijing (CN); MEGVII (BEIJING) TECHNOLOGY CO., LTD., Beijing (CN)

(72) Inventor: Keqing Chen, Beijing (CN)

(73) Assignees: BEIJING KUANGSHI TECHNOLOGY CO., LTD., Beijing (CN); MEGVII (BEIJING) TECHNOLOGY CO., LTD., Beijing (CN)

( * ) Notice: Subject to any disclaimer, the term of this patent is extended or adjusted under 35 U.S.C. 154(b) by 84 days.

(21) Appl. No.: 16/147,001

(22) Filed: Sep. 28, 2018

(65) Prior Publication Data

US 2019/0108408 A1    Apr. 11, 2019

(30) Foreign Application Priority Data

Oct. 11, 2017  (CN) .......................... 2017 1 0942203

(51) Int. Cl.
*G06K 9/00*   (2006.01)
*G06F 21/45*  (2013.01)
*G06F 21/32*  (2013.01)

(52) U.S. Cl.
CPC ......... *G06K 9/00892* (2013.01); *G06F 21/32* (2013.01); *G06F 21/45* (2013.01);
(Continued)

(58) Field of Classification Search
CPC .......... G06K 9/00892; G06K 9/00275; G06K 9/00288; G06K 9/00281; G06K 9/00926; G06K 9/00268; G06F 21/32; G06F 21/45
See application file for complete search history.

(56) References Cited

U.S. PATENT DOCUMENTS

2014/0040187 A1\* 2/2014 Hatori ................ G06K 9/00926
707/609
2014/0133713 A1\* 5/2014 Kim ........................ G06F 21/32
382/118

(Continued)

FOREIGN PATENT DOCUMENTS

CN        105096420      11/2015
CN        106326867      1/2017

(Continued)

OTHER PUBLICATIONS

First Chinese Office Action, issued in the corresponding Chinese Patent Application No. 201710942203.6, dated Apr. 21, 2020, 32 pages.

*Primary Examiner* — Wesley J Tucker
(74) *Attorney, Agent, or Firm* — Hamre, Schumann, Mueller & Larson, P.C.

(57) ABSTRACT

The application provides a data update method for face-to-unlock authentication, an authentication device and system, and a non-volatile storage medium. The data update method for face-to-unlock authentication includes: acquiring facial image data of a user to be unlock-authenticated; obtaining a plurality of candidate sets from the facial image data; determining whether there is target data satisfying a predetermined condition among the plurality of candidate sets; in the case where it is determined that there is target data satisfying the predetermined condition among the plurality of candidate sets, updating facial image data in a first set by
(Continued)

using the target data, wherein a first unlock authentication is performed based on the facial image data in the first set.

19 Claims, 4 Drawing Sheets

(52) U.S. Cl.
CPC ..... *G06K 9/00275* (2013.01); *G06K 9/00281* (2013.01); *G06K 9/00288* (2013.01); *G06K 9/00926* (2013.01)

(56) References Cited

U.S. PATENT DOCUMENTS

| | | | |
|---|---|---|---|
| 2015/0125046 A1* | 5/2015 | Ikenoue | G06F 21/32 382/115 |
| 2015/0234881 A1* | 8/2015 | Hirata | G06K 9/6255 707/609 |
| 2017/0032601 A1 | 2/2017 | Zhou et al. | |
| 2018/0189550 A1* | 7/2018 | McCombe | G06K 9/00288 |
| 2018/0308326 A1* | 10/2018 | Miwa | G08B 25/00 |

FOREIGN PATENT DOCUMENTS

| | | |
|---|---|---|
| CN | 206541317 | 10/2017 |
| CN | 108352107 | 7/2018 |

* cited by examiner ial image data of a user to be unlock-authenticated; obtaining a plurality of candidate sets from the facial image data; determining whether there is target data satisfying a predetermined condition among the plurality of candidate sets; in the case where it is determined that there is target data satisfying the predetermined condition among the plurality of candidate sets, updating facial image data in a blacklist set by using the target data, wherein a first unlock authentication is prohibited from being performed by using the facial image data in the blacklist set.

DATA UPDATE METHOD FOR FACE-TO-UNLOCK AUTHENTICATION, AUTHENTICATION DEVICE, AND NON-VOLATILE STORAGE MEDIUM

CROSS-REFERENCE TO RELATED APPLICATION

The present application claims the priority of Chinese patent application No. 201710942203.6 filed on Oct. 11, 2017, the disclosure of which is incorporated herein by reference in its entirety.

TECHNICAL FIELD

The embodiments of the present disclosure relate to data update method for face-to-unlock authentication, authentication device, and non-volatile storage medium.

BACKGROUND

With the development of society, the advancement of technology, the acceleration of life rhythm and the improvement of consumption level, face recognition technology has been widely used in fields such as government, military, banking, social welfare, e-commerce, security and defense. For example, a depositor walks into a bank, he goes to withdraw with no bank card or without recalling the password, when he is withdrawing money from ATM, a camera scans the user's face and thereafter user ID authentication is completed quickly and accurately, then the transaction is completed.

Face recognition technology has been widely acknowledged. The existing face recognition technology usually needs to register a face database before the first use, during each subsequent recognition and determination, the facial image acquired on site will be compared with the facial image initially registered in the face database. However, when the user's face changes with factors such as age, makeup, facelift, decoration, beard etc., the similarity with the facial image initially registered in the face database often becomes lower and lower, when the change reaches a certain degree, the user will not be identified, which results in failure of the verification.

SUMMARY

At least one embodiment of the present disclosure provides a data update method for face-to-unlock authentication, an authentication device and system, and a non-volatile storage medium, the data update method can automatically update the face database, which greatly improves practicability and intelligence of the authentication device.

According to an aspect of the present disclosure, at least one embodiment provides a data update method for face-to-unlock authentication, comprising: acquiring facial image data of a user to be unlock-authenticated; obtaining a plurality of candidate sets from the facial image data; determining whether there is target data satisfying a predetermined condition among the plurality of candidate sets; in the case where it is determined that there is target data satisfying the predetermined condition among the plurality of candidate sets, updating facial image data in a first set by using the target data, wherein a first unlock authentication is performed based on the facial image data in the first set.

According to another aspect of the present disclosure, at least one embodiment further provides a data update method According to another aspect of the present disclosure, at least one embodiment further provides an authentication device, comprising: a processor adapted to implement respective instructions; and a memory adapted to store a plurality of instructions, the instructions being adapted to be loaded by the processor and execute: acquiring facial image data of a user to be unlock-authenticated; obtaining a plurality of candidate sets from the facial image data; determining whether there is target data satisfying a predetermined condition among the plurality of candidate sets; in the case where it is determined that there is target data satisfying the predetermined condition among the plurality of candidate sets, updating facial image data in a first set by using the target data, wherein a first unlock authentication is performed based on the facial image data in the first set.

According to another aspect of the present disclosure, at least one embodiment further provides an authentication device, comprising: a processor adapted to implement respective instructions; and a memory adapted to store a plurality of instructions, the instructions being adapted to be loaded by the processor and execute: acquiring facial image data of a user to be unlock-authenticated; obtaining a plurality of candidate sets from the facial image data; determining whether there is target data satisfying a predetermined condition among the plurality of candidate sets; in the case where it is determined that there is target data satisfying the predetermined condition among the plurality of candidate sets, updating facial image data in a blacklist set by using the target data, wherein a first unlock authentication is prohibited from being performed by using the facial image data in the blacklist set.

According to another aspect of the present disclosure, at least one embodiment further provides a data update system for face-to-unlock authentication, comprising: the authentication device described above and a database, wherein the database includes the first set, the blacklist set, and the plurality of candidate sets.

According to another aspect of the present disclosure, at least one embodiment further provides a computer-readable non-volatile storage medium storing computer program instructions for performing the following steps when the computer executes the program instructions: acquiring facial image data of a user to be unlock-authenticated; obtaining a plurality of candidate sets from the facial image data; determining whether there is target data satisfying a predetermined condition among the plurality of candidate sets; in the case where it is determined that there is target data satisfying the predetermined condition among the plurality of candidate sets, updating facial image data in a first set by using the target data, wherein a first unlock authentication is performed based on the facial image data in the first set.

According to another aspect of the present disclosure, at least one embodiment further provides a computer-readable non-volatile storage medium storing computer program instructions for performing the following steps when the computer executes the program instructions: acquiring facial image data of a user to be unlock-authenticated; obtaining a plurality of candidate sets from the facial image data; determining whether there is target data satisfying a predetermined condition among the plurality of candidate sets; in the case where it is determined that there is target data satisfying the predetermined condition among the plurality of candidate sets, updating facial image data in a blacklist set by using the target data, wherein a first unlock authentication is prohibited from being performed by using the facial image data in the blacklist set.

BRIEF DESCRIPTION OF THE DRAWINGS

In order to more clearly illustrate the technical solutions in the embodiments of the present disclosure, drawings necessary for describing the embodiments will be briefly introduced below, obviously, these described drawings merely are some embodiments of the present disclosure, not intended to limit the present disclosure.

DETAILED DESCRIPTION OF THE EMBODIMENTS

Hereinafter, for those skilled in the art to better understand the solutions of the present disclosure, the technical solutions in the embodiments of the present disclosure will be described clearly and comprehensively in combination with the drawings in the embodiments of the present disclosure, obviously, these described embodiments are parts of the embodiments of the present disclosure, rather than all of the embodiments thereof. All the other embodiments obtained by those of ordinary skill in the art based on the embodiments of the present disclosure without paying creative efforts fall into the protection scope of the present disclosure.

It should be noted that the terms "first", "second" and the like in the specification, the claims and the drawings mentioned above of the present disclosure are used to distinguish similar objects, and are not necessarily used to describe a specific sequence or an order of precedence. As will be appreciated, the terms so used are interchangeable in appropriate situations, so that the embodiments of the present disclosure described herein can be implemented in a sequence other than those illustrated or described herein. In addition, the terms "comprise", "include" and any other variations thereof intend to cover nonexclusive inclusion so that the procedure, the method, the product or the equipment including a series of elements include not only these elements, but also other elements which are not listed explicitly, or also include inherent elements of these procedure, method, product or equipment.

Figure 1:
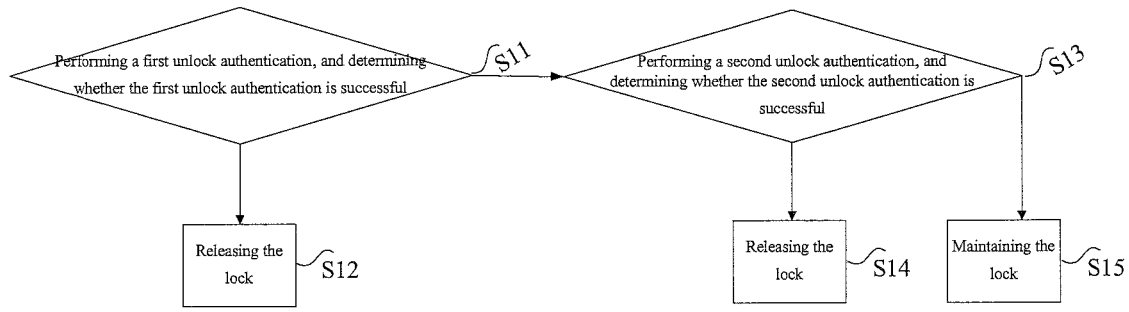
FIG. 1 is a flowchart of an authentication unlock method of an authentication device according to an embodiment of the present disclosure.

At least one embodiment of the present disclosure provides a flowchart of an authentication unlock method of an authentication device as shown in FIG. 1. The authentication device may include multiple types of authentication modes, for example, the first unlock authentication is facial image unlock authentication, and the second unlock authentication includes one or more of fingerprint unlock authentication, password unlock authentication, iris unlock authentication, retina unlock authentication, voiceprint unlock authentication, and gesture unlock authentication. Correspondingly, the authentication device may comprise an image acquisition assembly, such as a camera, for acquiring image data, like a facial image and/or a gesture image; and may further comprise a fingerprint acquisition assembly for acquiring a user fingerprint; or may comprise a sound wave acquisition assembly for acquiring a user sound wave; or may comprise an input assembly (such as a keyboard, a touch screen etc.) for obtaining an inputted password; or may comprise an iris acquisition assembly, such as a camera (like an infrared camera), for acquiring user iris data; or may comprise a retinal acquisition assembly, such as a camera, for acquiring user retina data. The authentication device can apply multiple unlocking authentication modes in a comprehensive manner, so that when one authentication mode fails, other authentication modes can be used for authentication, user experience is better, and security is higher.

The authentication device may be various fixed terminals or mobile terminals, the fixed terminals are, for example, terminals fixed on ATM machines, access control etc.; the mobile terminals are, for example, mobile phones, tablet computers, and notebook computers, and may also be portable, handheld, or vehicle-mounted mobile devices etc.

The authentication device can perform at least one unlock authentication method, and the authentication unlock method of the authentication device is as shown in FIG. 1. It should be noted that the steps shown in the flowchart of the drawings may be executed in a computer system by running, for example, a set of computer-executable instructions, and although the steps are presented in a logical order in the flowchart, in some situations, the steps shown or described may be executed in an order different from the ones described herein.

In an embodiment of the present disclosure, the authentication unlock method of the authentication device comprises the following steps:

Step S11, performing a first unlock authentication, and determining whether the first unlock authentication is successful; if yes, proceeding to step S12; if no, proceeding to step S13;

Step S12, releasing the lock;

Step S13, performing a second unlock authentication, and determining whether the second unlock authentication is successful; if yes, proceeding to step S14; if no, proceeding to step S15;

Step S14, releasing the lock;

Step S15, maintaining the lock.

The first unlock authentication is, for example, a face-to-unlock authentication; the second unlock authentication is, for example, other types of detection authentication. As can be known, in the process of performing authentication unlock, first, the authentication device needs to perform the first unlock authentication and acquire the facial image during the first unlock authentication. Thus the embodiment of the present application can store and classify the facial image acquired during the process of performing face-to-unlock authentication. For example, the acquired facial image that makes the first unlock authentication successful is classified into one type, e.g., a first category; the facial image acquired during the first unlock authentication and makes the first unlock authentication unsuccessful but the second unlock authentication successful is classified into one type, e.g., a second category; the facial image acquired during the first unlock authentication and makes the first unlock authentication and the second unlock authentication both unsuccessful is classified into one type, e.g., a third category. Moreover, a set of acquired facial images that are classified into the same category may be used as a candidate library of the face database, and the face database may be used for the face-to-unlock authentication that serves as the first unlock authentication. The candidate library may be used to update the face database, so that the authentication device can have the ability to update data in the face database while maintaining a security level.

Figure 2:
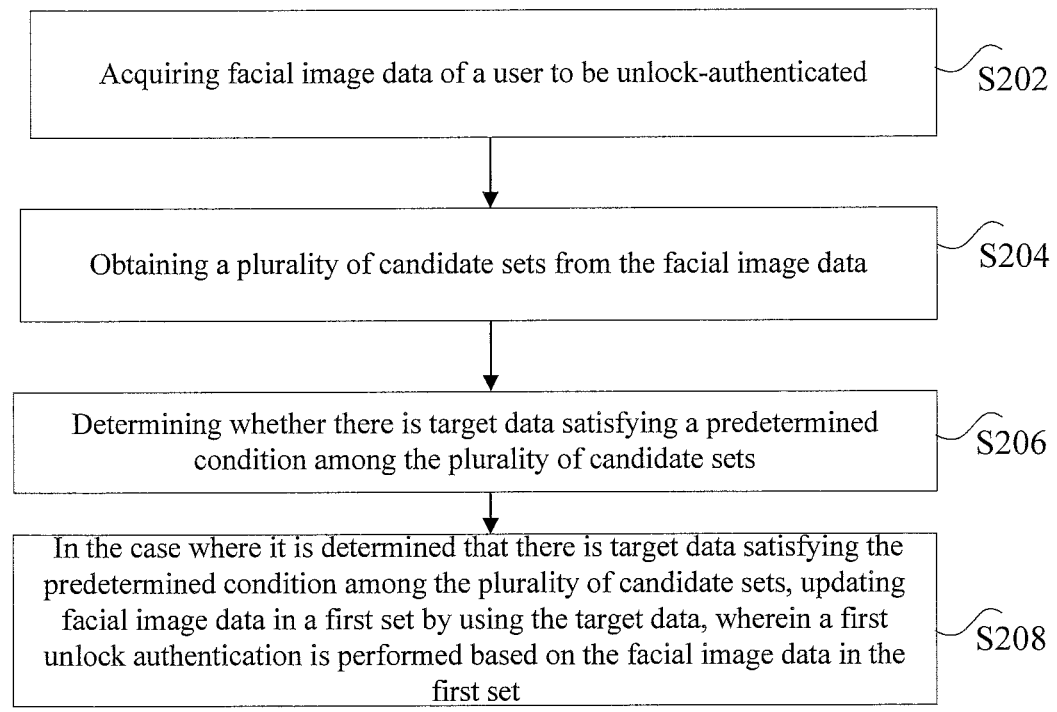
FIG. 2 is a flowchart of a data update method for face-to-unlock authentication according to an embodiment of the present disclosure.

At least one embodiment of the present disclosure provides a flowchart of a data update method for face-to-unlock authentication as shown in FIG. 2, the method may be applied to an authentication device, and used for, for example, updating the face database required for face-to-unlock. As shown in FIG. 2, the method in this embodiment may comprise the following steps:

Step S202, acquiring facial image data of a user to be unlock-authenticated;

Step S204, obtaining a plurality of candidate sets from the facial image data;

Step S206, determining whether there is target data satisfying a predetermined condition among the plurality of candidate sets;

Step S208, in the case where it is determined that there is target data satisfying the predetermined condition among the plurality of candidate sets, updating facial image data in a first set by using the target data, wherein a first unlock authentication is performed based on the facial image data in the first set.

In step S202, facial image data of a user to be unlock-authenticated is acquired. Typically, facial image data of the user to be unlock-authenticated may be acquired by an image capture assembly, such as a camera, and the facial image data may be a facial image, and may also be facial feature data extracted based on the facial image.

After acquiring the facial image data of the user to be unlock-authenticated, a plurality of candidate sets may be obtained from the facial image data in step S204. In one example, the authentication device may perform the first unlock authentication based on the facial image data in the first set. For example, the first set may be a face database, and correspondingly, the facial data in the first set may be facial images of a plurality of faces, or facial feature data of a plurality of faces. Storage of these facial features and organization manners of various features in the facial features may be determined according to the face detection authentication method used. For example, when using a neural network for face recognition, these facial features may be a set of feature vectors obtained by a trained neural network.

The plurality of candidate sets may be a plurality of sets of acquired facial image data classified into different categories. For example, the plurality of candidate sets include a first candidate set and a second candidate set, wherein the first candidate set includes facial image data of the user to be unlock-authenticated as acquired under authentication success of the first unlock authentication performed based on the acquired facial image data of the user to be unlock-authenticated and the facial image data in the first set; the second candidate set includes facial image data of the user to be unlock-authenticated as acquired under authentication success of a second unlock authentication performed when the first unlock authentication performed based on the acquired facial image data of the user to be unlock-authenticated and the facial image data in the first set fails; herein, the first unlock authentication is different from the second unlock authentication.

In the case where a plurality of candidate sets are obtained from the facial image data, it may be determined whether there is target data satisfying a predetermined condition among the plurality of candidate sets in step S206; in the case where it is determined that there is target data satisfying the predetermined condition among the plurality of candidate sets, facial image data in a first set may be updated by using the target data in step S208, wherein updating facial image data in a first set by using the target data may comprise: adding the target data to the first set, or replacing facial image data in the first set and corresponding to the target data.

Specifically, it may be determined whether there is target data satisfying the predetermined condition in the first candidate set in step S206, facial image data in the first set and corresponding to the target data is replaced by using the target data in step S208 in the case where it is determined that there is target data satisfying the predetermined condition in the first candidate set; or, it may be determined whether there is target data satisfying the predetermined condition in the second candidate set in step S206, the target data is added to the first set in step S208 in the case where it is determined that there is target data satisfying the predetermined condition in the second candidate set.

Figure 3:
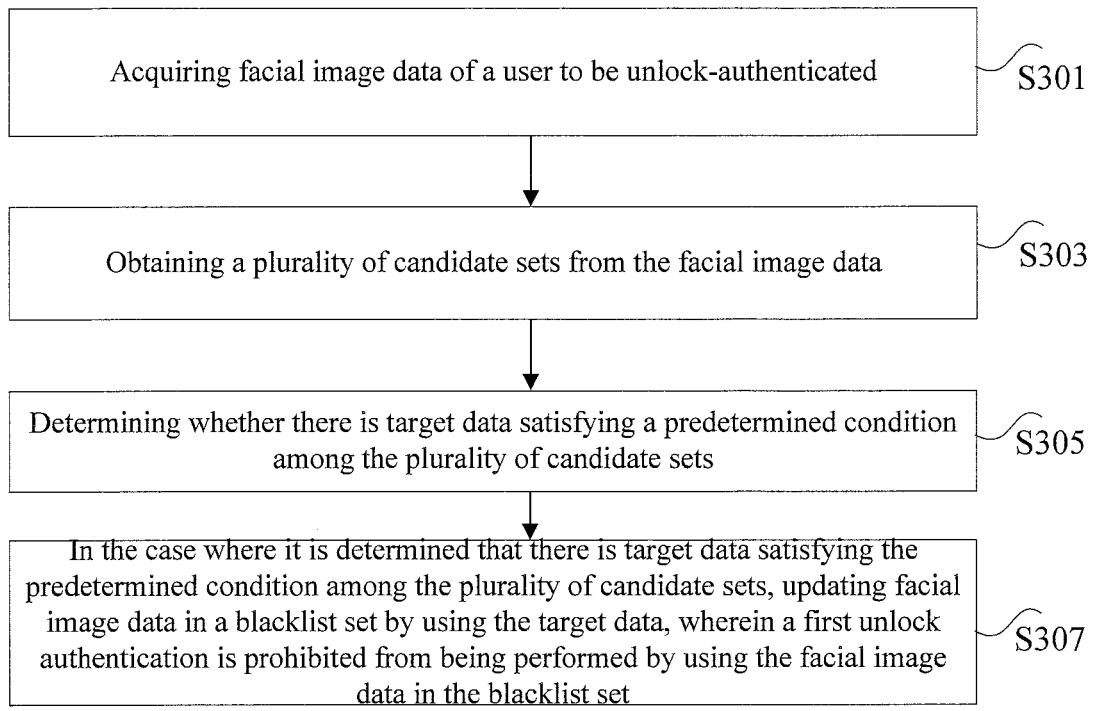
FIG. 3 is a flowchart of a data update method for face-to-unlock authentication according to an embodiment of the present disclosure.

At least one embodiment of the present disclosure provides a flowchart of a data update method for face-to-unlock authentication as shown in FIG. 3, the method may be applied to an authentication device, and used for, for example, updating a blacklist set, and the blacklist set is used to prevent the attacker from performing face unlock authentication, which makes the face unlock authentication more secure. As shown in FIG. 3, the method in this embodiment may comprise the following steps:

Step S301, acquiring facial image data of a user to be unlock-authenticated;

Step S303, obtaining a plurality of candidate sets from the facial image data;

Step S305, determining whether there is target data satisfying a predetermined condition among the plurality of candidate sets;

Step S307, in the case where it is determined that there is target data satisfying the predetermined condition among the plurality of candidate sets, updating facial image data in a blacklist set by using the target data, wherein a first unlock authentication is prohibited from being performed by using the facial image data in the blacklist set.

In an embodiment, the authentication device can prevent an attacker's attack based on the facial image data in the blacklist set. Correspondingly, the facial image data in the blacklist set may be facial images of a plurality of faces, or facial feature data of a plurality of faces. Storage of these facial features and organization manners of various features in the facial features may be determined according to the face detection authentication method used. For example, when using a neural network for face recognition, these facial features may be a set of feature vectors obtained by a trained neural network. Optionally, the foregoing steps S301, S303, and S305 may adopt the process similar to steps S202, S204, and S206.

In addition, it needs to be noted that, the plurality of candidate sets include a third candidate set, wherein the third candidate set includes facial image data of the user to be unlock-authenticated as acquired under authentication failure of a second unlock authentication performed when the first unlock authentication performed based on the acquired facial image data of the user to be unlock-authenticated and the facial image data in the first set fails.

In step S307, facial image data in a blacklist set is updated by using the target data, updating facial image data in a blacklist set by using the target data may comprise: adding the target data to the blacklist set.

Specifically, it may be determined whether there is target data satisfying the predetermined condition in the third candidate set in step S305, the target data is added to the blacklist set in the case where it is determined that there is target data satisfying the predetermined condition in the third candidate set in step S307.

According to the above embodiment of the present disclosure, the first set is updated based on different situations of the target data that meets the predetermined condition among the plurality of candidate sets corresponding to the first set, thus solving the technical problem that the verification fails because the user cannot be identified due to change of the facial features; the blacklist is updated based on the target data that meets the predetermined condition among the plurality of candidate sets corresponding to the blacklist set, so that face unlock authentication is more secure, and usability of the authentication device is greatly improved while security of the authentication device and the authentication system is maintained.

In addition, in an embodiment of the present disclosure, determining whether there is target data satisfying a predetermined condition among the plurality of candidate sets in step S206 or S305 may comprise: determining respectively whether there are a plurality of facial image data belonging to the same face among the facial image data corresponding to a respective candidate set, and obtaining a determination result; in the case where it is determined that there are a plurality of facial image data belonging to the same face among the facial image data corresponding to a candidate set, and an amount of the plurality of facial image data exceeds a first threshold, determining that there is target data satisfying the predetermined condition in a candidate set.

For example, one candidate set related to face-to-unlock authentication may include a plurality of acquired facial images, so that facial features of each facial image may be extracted, thereby a plurality of feature data corresponding to the plurality of facial images in one candidate set are extracted, one piece of feature data may be a plurality of facial features corresponding to one facial image, and these facial features include, but not limited to, a forehead, an eyelid, a cheek, a mouth corner, a beard, an eye corner, a glabella, and the like. Further, a plurality of facial images belonging to the same face in one candidate set may be determined, and in the case where an amount of the plurality of facial images exceeds a first threshold, it is determined that the candidate set has target data satisfying a predetermined condition. The target data is facial image data of the same face exceeding the first threshold in said candidate set. The first threshold may be set in advance according to an application scenario, for example, as for a situation where the security level is high, the first threshold may be set to be large, and the first threshold may be set to be small in a contrary situation.

In other words, if the amount of facial image data of the same face (which may be referred to also as the amount of facial images having similar facial features) in one candidate set exceeds the first threshold, it is determined that there is target data satisfying the predetermined condition in this candidate set, the target data is similar facial image data exceeding the first threshold.

That is, if the amount of facial images of the same face exceeds the first threshold in the first candidate set, the corresponding facial image in the face database is replaced by the facial image data exceeding the first threshold, thereby the face database is updated, the updated face database can be closer to the current user state. Optionally, the corresponding facial image of the face database may be replaced by the latest acquired facial image from among the facial image data exceeding the first threshold. Therefore, by means of updating the first set according to the first candidate set, the technical problem of slow face change can be solved, the face slow change includes aging of the face with age (e.g., appearance of various wrinkles, streaks, and upper and lower eyelid bag, especially the lower eyelid bag, deepening of the nasolabial fold etc.), growth of the beard.

If the amount of facial images of the same face in the second candidate set exceeds the threshold, the facial image data exceeding the threshold is added to the face database. Optionally, the latest acquired facial image in the facial image data exceeding the threshold may be added to the face database. Thus, by means of updating the first set according to the second candidate set, the problem of sudden face change, such as facial makeup, facelift, shaving of the beard, decoration etc. can be solved.

If the amount of facial images of the same face in the third candidate set exceeds the threshold, the facial image data exceeding the threshold is added to the blacklist set. Optionally, it is possible to add only the latest acquired facial image in the facial image data exceeding the threshold to the blacklist set. Thus, by means of updating the blacklist set according to the third candidate set, the face that attempts to unlock multiple times can be prevented, so that the first unlock authentication is more secure.

In addition, in an embodiment of the present disclosure, in the case where it is determined that there is target data satisfying the predetermined condition in a candidate set in step S206 or S305, the method further comprises: verifying whether the target data matches the facial image data in the first set or the blacklist set, and in the case where the verification successes, updating the facial image data in the first set or the blacklist set by using the target data.

For example, verifying whether the target data matches the facial image data in the first set or the blacklist set may comprise: matching the target data with the facial image data in the first set or the blacklist set to obtain a matching result; in the case where the matching result indicates that the target data is consistent with a timeline change with respect to the facial image data in the first set or the blacklist set, the verification successes; or, in the case where the matching result indicates that the target data differs from the facial image data in the first set or the blacklist set in a specific region, the verification successes.

In the case where the first unlock authentication is a facial image unlock authentication, matching the target data with the facial image data in the first set or the blacklist set may comprise: extracting texture features of a first region on a face from among the target data; determining, via predetermined texture features of the facial image data in the first set, whether a similarity between the texture features of the first region on a face and the predetermined texture feature in the target data exceeds a second threshold; in the case where it is determined that the similarity between the texture features of the first region on a face and the predetermined texture feature in the target data exceeds the second threshold, the matching result indicates that the target data is consistent with a timeline change with respect to the facial image data in the first set; the first region includes at least one of a forehead, an eyelid, a cheek, a mouth corner, a beard, an eye corner, and a glabella or any combination thereof.

It should be noted that, the timeline change mentioned above may be a timeline change of the wrinkles, but the present disclosure is not limited thereto, and the timeline change may also be, for example, a timeline change of the streaks. The present disclosure illustrates a verification method of an embodiment of the present disclosure by taking the timeline change of the wrinkles as an example.

Since wrinkles are widely distributed on the human face, there are wrinkles distributed on the forehead, the eyelids, the cheeks, the mouth corners, and so on, texture features of the regions such as the forehead, the eyelids, the cheeks, the mouth corners of the face in the target data can be extracted in this embodiment, the texture features are wrinkle features. Since this embodiment can collect data in the first candidate set, the second candidate set, and the third candidate set in one time window (e.g., one day, one week, one month), the texture features of the same object do not have too big difference. Therefore, in this embodiment, the texture features extracted from the target data can be directly compared with the predetermined texture features in the face database, to determine whether a similarity between the predetermined texture features and the texture features extracted from the target data exceeds a second threshold, the second threshold may be set in advance. In the case where it is determined that the similarity between the predetermined texture features and the texture features extracted from the target data exceeds the second threshold (e.g., 80%), the target data may be determined is consistent with the timeline change with respect to the facial image data in the first set or the blacklist set.

Alternatively, in the case where the matching result indicates that the target data differs from the facial image data in the first set or the blacklist set in a specific region, the verification successes. For example, the specific region includes, but not limited to, a glasses region and a whisker region.

In the case where the first unlock authentication is a facial image unlock authentication, matching the target data with the facial image data in the first set or the blacklist set may comprise: extracting facial image data corresponding to a specific region on a face from among the target data; matching the facial image data other than data of the specific region in the target data with the facial image data in the first set; in the case where the matching successes, the matching result indicates that the target data differs from the facial image data in the first set or the blacklist set in the specific region; optionally, the specific region includes at least one of a glasses region and a whisker region.

In addition, in an embodiment of the present disclosure, determining whether there is target data satisfying a predetermined condition among the plurality of candidate sets in step S206 or S305 may further comprise: determining periodically whether there is target data satisfying the predetermined condition in the plurality of candidate sets; in the case where it is determined that there is target data satisfying the predetermined condition in the plurality of candidate sets, updating the facial image data in the first set or in the blacklist set by using the target data.

Optionally, if data in the first candidate set, the second candidate set, and the third candidate set are collected within a preset time period (e.g., one day, one week, one month), the embodiment of the present disclosure may periodically make judgment with respect to the collected data, and determine that one piece of or some facial image data in a candidate set is to be added or replaced into the face database or added to the blacklist.

Through the above embodiment of the present disclosure, the first set and the blacklist set are updated based on the target data meeting the predetermined condition in the plurality of candidate sets, thus solving the technical problem of verification failure caused by that the user cannot be recognized some time later, and usability of the authentication device is greatly improved.

Through the above description of the implementations, those skilled in the art can clearly understand that the method according to the embodiment in the above may be implemented in a manner of software plus a necessary hardware platform, and of course it may also be implemented by hardware, but in many cases the former is a better implementation. Based on such understanding, the essence or the part that contributes to the prior art of the technical solution of the present disclosure may be embodied in the form of a software product, the computer software product is stored in a storage medium (such as ROM/RAM, disk, CD-ROM) and includes several instructions for causing a terminal device (which may be a mobile phone, a computer, a server, or a network device) to perform the method described in the embodiment of the present disclosure.

Figure 4:
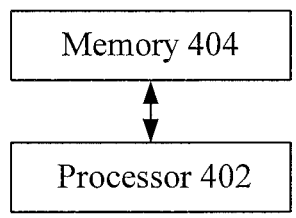
FIG. 4 is a schematic diagram of an authentication device according to an embodiment of the present disclosure.

At least one embodiment of the present disclosure further provides an authentication device, as shown in FIG. 4, the authentication device comprises a processor 402 and a memory 404, the memory 404 is configured to store computer program instructions, the computer program instructions are adapted to be loaded by the processor and execute the following method: acquiring facial image data of a user to be unlock-authenticated; obtaining a plurality of candidate sets from the facial image data; determining whether there is target data satisfying a predetermined condition among the plurality of candidate sets; in the case where it is determined that there is target data satisfying the predetermined condition among the plurality of candidate sets, updating facial image data in a first set by using the target data, wherein a first unlock authentication is performed based on the facial image data in the first set.

The processor 402 may be various applicable processors, for example, implemented in the form of a central processing unit, a microprocessor, an embedded processor etc., and may adopt an architecture such as X86, ARM etc.; the memory 404 may be various applicable storage devices, for example, a non-volatile storage device, including but not limited to a magnetic storage device, a semiconductor storage device, an optical storage device etc., the embodiment of the present disclosure makes no limitations thereto.

In addition, according to an embodiment of the present disclosure, updating facial image data in a first set by using the target data comprises: adding the target data to the first set, or replacing facial image data in the first set and corresponding to the target data.

In addition, according to an embodiment of the present disclosure, the plurality of candidate sets include a first candidate set and a second candidate set, the first candidate set includes facial image data of the user to be unlock-authenticated as acquired under authentication success of the first unlock authentication performed based on the acquired facial image data of the user to be unlock-authenticated and the facial image data in the first set; the second candidate set includes facial image data of the user to be unlock-authenticated as acquired under authentication success of a second unlock authentication performed when the first unlock authentication performed based on the acquired facial image data of the user to be unlock-authenticated and the facial image data in the first set fails; the first unlock authentication is different from the second unlock authentication.

In addition, according to an embodiment of the present disclosure, it is determined whether there is target data satisfying the predetermined condition in the first candidate set, facial image data in the first set and corresponding to the target data is replaced by using the target data in the case where it is determined that there is target data satisfying the predetermined condition in the first candidate set; it is determined whether there is target data satisfying the predetermined condition in the second candidate set, the target data is added to the first set in the case where it is determined that there is target data satisfying the predetermined condition in the second candidate set.

Figure 5:
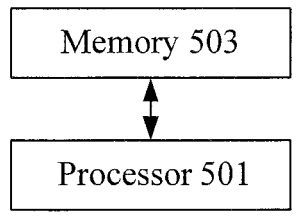
FIG. 5 is a schematic diagram of an authentication device according to an embodiment of the present disclosure.

At least one embodiment of the present disclosure further provides an authentication device, as shown in FIG. 5, the authentication device comprises a processor 501 and a memory 503, the memory 503 is configured to store computer program instructions, the computer program instructions are adapted to be loaded by the processor and execute the following method: acquiring facial image data of a user to be unlock-authenticated; obtaining a plurality of candidate sets from the facial image data; determining whether there is target data satisfying a predetermined condition among the plurality of candidate sets; in the case where it is determined that there is target data satisfying the predetermined condition among the plurality of candidate sets, updating facial image data in a blacklist set by using the target data, wherein a first unlock authentication is prohibited from being performed by using the facial image data in the blacklist set.

In addition, according to an embodiment of the present disclosure, updating facial image data in a blacklist set by using the target data comprises: adding the target data to the blacklist set.

In addition, according to an embodiment of the present disclosure, the plurality of candidate sets include a third candidate set, the third candidate set includes facial image data of the user to be unlock-authenticated as acquired under authentication failure of a second unlock authentication performed when the first unlock authentication performed based on the acquired facial image data of the user to be unlock-authenticated and the facial image data in the first set fails; it is determined whether there is target data satisfying the predetermined condition in the third candidate set, the target data is added to the blacklist set in the case where it is determined that there is target data satisfying the predetermined condition in the third candidate set.

Optionally, the authentication device in the embodiment of FIG. 4 and the authentication device in the embodiment of FIG. 5 may be the same authentication device. In the embodiments of FIG. 4 and FIG. 5, for example, data in the first set, the blacklist set and/or the candidate set may be stored in a local database or in a network database, the network database may be arranged in a local area network or arranged in a wide area network, for example, in the Internet, or arranged in the cloud, which may be a private cloud or a public cloud.

In addition, according to an embodiment of the present disclosure, the first unlock authentication is a facial image unlock authentication, the second unlock authentication includes at least one of: fingerprint unlock authentication, password unlock authentication, iris unlock authentication, retina unlock authentication, voiceprint unlock authentication, and gesture unlock authentication.

In addition, according to an embodiment of the present disclosure, the processor 402 and the processor 501 further load computer program instructions and execute the following: determining respectively whether there are a plurality of facial image data belonging to the same face among the facial image data corresponding to a respective candidate set, and obtaining a determination result; in the case where it is determined that there are a plurality of facial image data belonging to the same face among the facial image data corresponding to a candidate set, and an amount of the plurality of facial image data exceeds a first threshold, determining that there is target data satisfying the predetermined condition in a candidate set; wherein the target data is facial image data of the same face whose amount exceeds the first threshold in a candidate set.

In addition, according to an embodiment of the present disclosure, the processor 402 and the processor 501 further load computer program instructions and execute the following: verifying whether the target data matches the facial image data in the first set or the blacklist set, and in the case where the verification successes, updating the facial image data in the first set or the blacklist set by using the target data.

In addition, according to an embodiment of the present disclosure, the processor 402 and the processor 501 further load computer program instructions and execute the following: matching the target data with the facial image data in the first set or the blacklist set to obtain a matching result; in the case where the matching result indicates that the target data is consistent with a timeline change with respect to the facial image data in the first set or the blacklist set, the verification successes; or, in the case where the matching result indicates that the target data differs from the facial image data in the first set or the blacklist set in a specific region, the verification successes.

In addition, according to an embodiment of the present disclosure, in the case where the first unlock authentication is a facial image unlock authentication, the processor 402 and the processor 501 further load computer program instructions and execute the following: extracting texture features of a first region on a face from among the target data; determining, via predetermined texture features of the facial image data in the first set, whether a similarity between the texture features of the first region on a face and the predetermined texture feature in the target data exceeds a second threshold; in the case where it is determined that the similarity between the texture features of the first region on a face and the predetermined texture feature in the target data exceeds the second threshold, the matching result indicates that the target data is consistent with a timeline change with respect to the facial image data in the first set; the first region includes at least one of a forehead, an eyelid, a cheek, a mouth corner, a beard, an eye corner, and a glabella or any combination thereof.

In addition, according to an embodiment of the present disclosure, in the case where the first unlock authentication is a facial image unlock authentication, the processor 402 and the processor 501 further load computer program instructions and execute the following: extracting facial image data corresponding to a specific region on a face from among the target data; matching the facial image data other than data of the specific region in the target data with the facial image data in the first set; in the case where the matching successes, the matching result indicates that the target data the target data differs from the facial image data in the first set or the blacklist set in the specific region; the specific region includes at least one of a glasses region and a whisker region.

In addition, according to an embodiment of the present disclosure, the processor 402 and the processor 501 further load computer program instructions and execute the following: determining periodically whether there is target data satisfying the predetermined condition in the plurality of candidate sets; in the case where it is determined that there is target data satisfying the predetermined condition in the plurality of candidate sets, updating the facial image data in the first set or in the blacklist set by using the target data.

Through the above embodiment of the present disclosure, the first set and the blacklist set are updated based on the target data meeting the predetermined condition in the plurality of candidate sets, thus solving the technical problem of verification failure caused by that the user cannot be recognized some time later, and usability of the authentication device is greatly improved.

Figure 6:
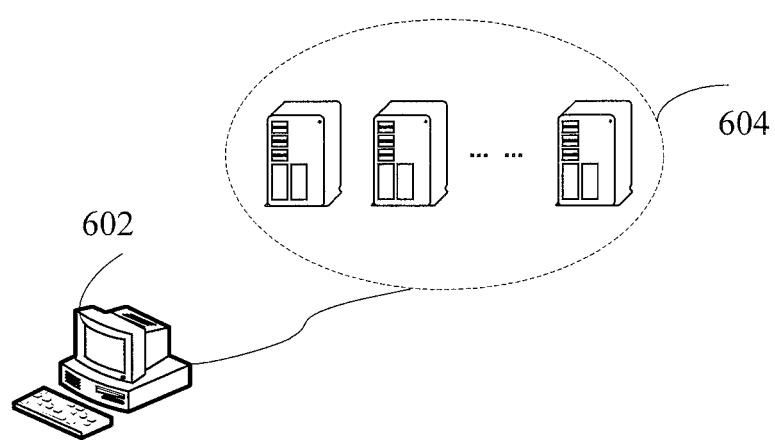
FIG. 6 is a schematic diagram of a data update system for face-to-unlock authentication according to an embodiment of the present disclosure.

At least one embodiment of the present disclosure further provides a data update system for face-to-unlock authentication, comprising an authentication device. Optionally, the data update system for face-to-unlock may comprise an environment as shown in FIG. 6, the environment may include a hardware environment and a network environment. The aforesaid hardware environment includes an authentication device 602 and a server 604, the database is running on, for example, the server 604, the database includes the first set, the blacklist set, and the plurality of candidate sets employed in the method described above, the database may be set to any available form, such as a relational database etc., the authentication device 602 can operate the database through corresponding instructions so that data can be read, changed, added, and the like. Another embodiment of the present disclosure does not include a server, the database is, for example, set within the authentication device 602, that is, being set locally. It should be noted that the hardware environment and structure illustrated in FIG. 6 are merely exemplary, rather than restrictive; the hardware environment may also have other components and structures as needed, and may include, for example, a gateway or the like.

The authentication device 602 may be one or multiple, and the authentication device 602 may comprise a plurality of processing nodes for processing the data obtained from other authentication devices, and the plurality of processing nodes may serve as an entirety externally. Optionally, the authentication device 602 may also send data to the server 604, so that the server 604 processes the data sent by the authentication device 602. Optionally, one authentication device among multiple authentication devices 602 may be connected to the other authentication devices through a network. The authentication device may also be connected to the server 604 through a network.

The above network includes a wired network and a wireless network. The wireless network includes, but not limited to, a wide area network, a metropolitan area network, a local area network, or a mobile data network. Typically, the mobile data network includes, but not limited to, a GSM network, a CDMA network, a WCDMA network, a LTE communication network, and a WIFI network, a ZigBee network, a Bluetooth-based network etc. Different types of communication networks may be operated by different operators. The type of communication network does not constitute a limitation on the embodiments of the present disclosure.

Figure 7:
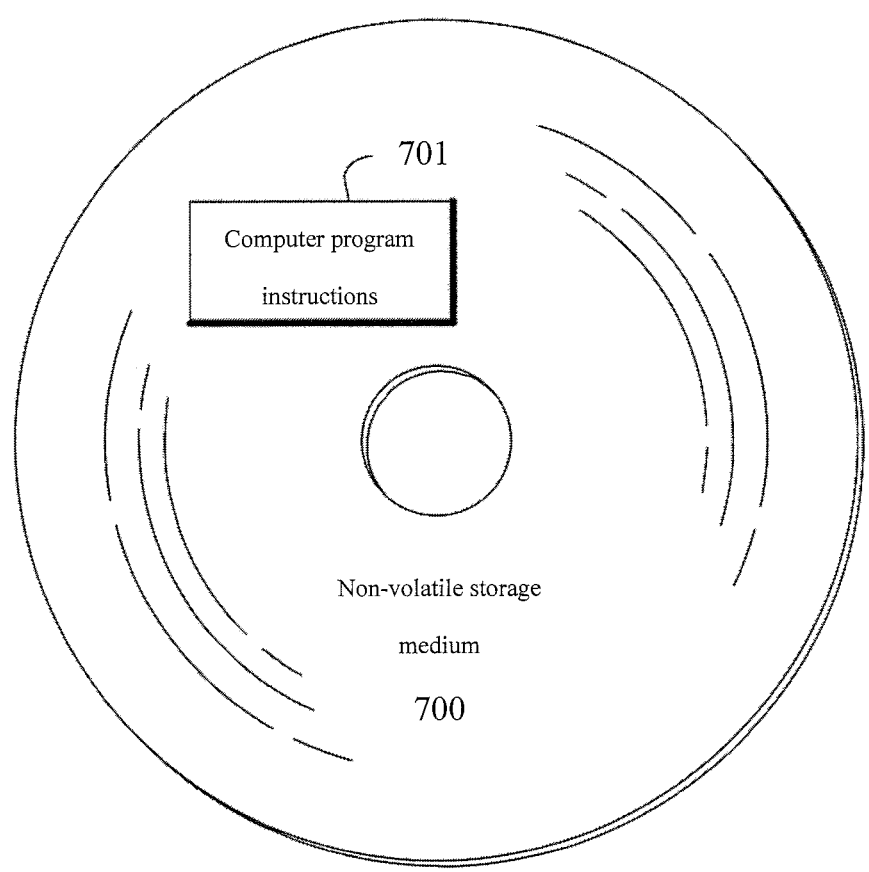
FIG. 7 is a schematic diagram of a non-volatile storage medium according to an embodiment of the present disclosure.

At least one embodiment of the present disclosure further provides a computer-readable non-volatile storage medium, as shown in FIG. 7, the non-volatile storage medium 700 according to an embodiment of the present disclosure stores computer program instructions 701, the following steps are performed when the computer program instructions are executed:

acquiring facial image data of a user to be unlock-authenticated;

obtaining a plurality of candidate sets from the facial image data;

determining whether there is target data satisfying a predetermined condition among the plurality of candidate sets;

in the case where it is determined that there is target data satisfying the predetermined condition among the plurality of candidate sets, updating facial image data in a first set by using the target data, wherein a first unlock authentication is performed based on the facial image data in the first set.

At least one embodiment of the present disclosure further provides a computer-readable non-volatile storage medium storing computer program instructions, the following steps are performed when the computer program instructions are executed: acquiring facial image data of a user to be unlock-authenticated;

obtaining a plurality of candidate sets from the facial image data;

determining whether there is target data satisfying a predetermined condition among the plurality of candidate sets;

in the case where it is determined that there is target data satisfying the predetermined condition among the plurality of candidate sets, updating facial image data in a blacklist set by using the target data, wherein a first unlock authentication is prohibited from being performed by using the facial image data in the blacklist set.

It should be noted that, as for the embodiments of the system, the method, the authentication device, and the storage medium described above, they are described as a series of actions or a combination of modules for the sake of brevity, but those skilled in the art should understand that the present disclosure is not limited by the sequence of the actions or the connection of modules described, because according to the present disclosure, some steps may be performed in other sequences or concurrently performed, and some modules may employ other connections.

Those skilled in the art should also understand that each of the embodiments described in the specification belongs to a type of embodiment, and the above-mentioned embodiment numbers are only for description, and the actions and modules involved are not necessarily required by the present disclosure.

In the above-mentioned embodiments of the present disclosure, descriptions of the various embodiments have their own emphasis, as for details that are not explained in a certain embodiment, reference may be made to the related descriptions of other embodiments.

In the several embodiments provided by the present application, it should be understood that the disclosed technical content may be implemented by other ways. The device embodiments described above are merely illustrative, for example, the division of the units only is a logical division of functions, there may be other division manners in practical implementations, for instance, a plurality of units or components may be combined, or may be integrated in another system, or certain features may be omitted or not carried out. Further, the coupling or direct coupling or communicative connection between the respective components shown or discussed therein may be carried out via certain interfaces, and indirect coupling or communicative connection between devices or units may be electrical, or others forms.

The above units described as separate members may be, or may not be physically separated, the components shown as a unit may or may not be a physical unit; they may be located in one place, or may be disposed on a plurality of network units; it is possible to select parts or all units among them according to actual needs to achieve the aim of the solution of the embodiments.

In addition, the respective functional units in the respective embodiments of the present disclosure may be all integrated within one processing unit, and it may also be that each unit serves as a unit independently, it may also be that two or more units are integrated within one unit; the aforesaid integrated unit not only can be implemented in the form of hardware, but also can be implemented in the form of software functional units.

The integrated unit, if implemented in the form of a software functional unit and sold or used as a standalone product, may be stored in a computer-readable storage medium. Based on such understanding, the essence or the part of the technical solutions of the present disclosure that contributes to the prior art or all or part of the technical solution may be embodied in the form of a software product stored in a storage medium and including several instructions to cause a computer device (which may be a personal computer, a server or a network device etc.) to perform all or part of the steps of the methods described in various embodiments of the present disclosure. The foregoing storage medium includes a volatile storage medium or a non-volatile storage medium, such as a variety of medium that can store program codes, such as a USB flash drive, a read-only memory (ROM), a random access memory (RAM), a mobile hard disk, a magnetic disk, or an optical disk.

The above description is only preferred embodiments of the present disclosure, and it should be noted that those of ordinary skill in the art may also make several improvements and refinements without departing from the principles of the present disclosure, these improvements and refinements should be considered as within the protection scope of the present disclosure.

What is claimed is:

1. A data update method for face-to-unlock authentication, comprising:
    acquiring facial image data of a user to be unlock-authenticated;
    obtaining a plurality of candidate sets from the facial image data;
    determining whether there is target data satisfying a first predetermined condition among the plurality of candidate sets;
    in the case where it is determined that there is target data satisfying the first predetermined condition among the plurality of candidate sets, updating facial image data in a first set by using the target data, wherein a first unlock authentication is performed based on the facial image data in the first set,
    wherein the plurality of candidate sets include a third candidate set,
    the third candidate set includes facial image data of the user to be unlock-authenticated as acquired under authentication failure of a second unlock authentication performed when the first unlock authentication performed based on acquired facial image data of the user to be unlock-authenticated and the facial image data in the first set fails;
    it is determined whether there is target data satisfying a second predetermined condition in the third candidate set, the target data is added to a blacklist set in the case where it is determined that there is target data satisfying the second predetermined condition in the third candidate set.

2. The data update method according to claim 1, wherein the plurality of candidate sets further include a first candidate set and a second candidate set,
    the first candidate set includes facial image data of the user to be unlock-authenticated as acquired under authentication success of the first unlock authentication performed based on the acquired facial image data of the user to be unlock-authenticated and the facial image data in the first set;
    the second candidate set includes facial image data of the user to be unlock-authenticated as acquired under authentication success of the second unlock authentication performed when the first unlock authentication performed based on the acquired facial image data of the user to be unlock-authenticated and the facial image data in the first set fails;
    the first unlock authentication is different from the second unlock authentication.

3. The data update method according to claim 2, wherein
    it is determined whether there is target data satisfying the first predetermined condition in the first candidate set, facial image data in the first set and corresponding to the target data is replaced by using the target data in the case where it is determined that there is target data satisfying the first predetermined condition in the first candidate set;
    it is determined whether there is target data satisfying the first predetermined condition in the second candidate set, the target data is added to the first set in the case where it is determined that there is target data satisfying the first predetermined condition in the second candidate set.

4. The data update method according to claim 2, wherein the first unlock authentication is a facial image unlock authentication,
    the second unlock authentication includes at least one of the following: fingerprint unlock authentication, password unlock authentication, iris unlock authentication, retina unlock authentication, voiceprint unlock authentication, and gesture unlock authentication.

5. The data update method according to claim 1, further comprising:
    determining whether there is target data satisfying the second predetermined condition among the plurality of candidate sets;
    in the case where it is determined that there is target data satisfying the second predetermined condition among the plurality of candidate sets, updating facial image data in the blacklist set by using the target data, wherein the first unlock authentication is prohibited from being performed by using the facial image data in the blacklist set.

6. The data update method according to claim 5, wherein
updating facial image data in the first set by using the target data comprises: adding the target data to the first set, or replacing facial image data in the first set and corresponding to the target data;
updating facial image data in the blacklist set by using the target data comprises: adding the target data to the blacklist set.

7. The data update method according to claim 5, wherein determining whether there is target data satisfying the first predetermined condition among the plurality of candidate sets and determining whether there is target data satisfying the second predetermined condition among the plurality of candidate sets comprises:
determining respectively whether there are a plurality of facial image data belonging to the same face among the facial image data corresponding to a respective candidate set, and obtaining a determination result;
in the case where it is determined that there are a plurality of facial image data belonging to the same face among the facial image data corresponding to a candidate set, and an amount of the plurality of facial image data exceeds a first threshold, determining that there is target data satisfying the first predetermined condition or target data satisfying the second predetermined condition in the candidate set,
the target data is facial image data of the same face that exceeds the first threshold in the candidate set.

8. The data update method according to claim 7, wherein in the case where it is determined that there is target data satisfying the first predetermined condition or target data satisfying the second predetermined condition in a candidate set, the method further comprising:
verifying whether the target data matches the facial image data in the first set or the blacklist set, and in the case where the verification successes, updating the facial image data in the first set or the blacklist set by using the target data.

9. The data update method according to claim 8, wherein verifying whether the target data matches the facial image data in the first set or the blacklist set comprises:
matching the target data with the facial image data in the first set or the blacklist set to obtain a matching result;
in the case where the matching result indicates that the target data is consistent with a timeline change with respect to the facial image data in the first set or the blacklist set, the verification successes; or
in the case where the matching result indicates that the target data differs from the facial image data in the first set or the blacklist set in a specific region, the verification successes.

10. The data update method according to claim 9, wherein in the case where the first unlock authentication is a facial image unlock authentication, matching the target data with the facial image data in the first set or the blacklist set comprises:
extracting texture features of a first region on a face from among the target data;
determining, via predetermined texture features of the facial image data in the first set, whether a similarity between the texture features of the first region on a face and the predetermined texture feature in the target data exceeds a second threshold;
in the case where it is determined that the similarity between the texture features of the first region on a face and the predetermined texture feature in the target data exceeds the second threshold, the matching result indicates that the target data is consistent with a timeline change with respect to the facial image data in the first set;
the first region includes at least one of a forehead, an eyelid, a cheek, a mouth corner, a beard, an eye corner, and a glabella or any combination thereof.

11. The data update method according to claim 9, wherein in the case where the first unlock authentication is a facial image unlock authentication, matching the target data with the facial image data in the first set or the blacklist set comprises:
extracting facial image data corresponding to a specific region on a face from among the target data;
matching the facial image data other than data of the specific region in the target data with the facial image data in the first set;
in the case where the matching successes, the matching result indicates that the target data differs from the facial image data in the first set or the blacklist set in the specific region;
the specific region includes at least one of a glasses region and a whisker region.

12. The data update method according to claim 5, wherein determining whether there is target data satisfying a predetermined condition among the plurality of candidate sets further comprises:
determining periodically whether there is target data satisfying the first predetermined condition or target data satisfying the second predetermined condition in the plurality of candidate sets; in the case where it is determined that there is target data satisfying the first predetermined condition in the plurality of candidate sets, updating the facial image data in the first set by using the target data; or, in the case where it is determined that there is target data satisfying the second predetermined condition in the plurality of candidate sets, updating the facial image data in the blacklist set.

13. An authentication device, comprising:
a processor adapted to implement respective instructions; and
a memory adapted to store a plurality of instructions, the instructions being adapted to be loaded by the processor and execute the data update method for face-to-unlock authentication according to claim 1.

14. A computer-readable non-volatile storage medium storing computer program instructions for performing the data update method for face-to-unlock authentication according to claim 1, when a computer executes the program instructions.

15. A data update method for face-to-unlock authentication, comprising:
acquiring facial image data of a user to be unlock-authenticated;
obtaining a plurality of candidate sets from the facial image data;
determining whether there is target data satisfying a first predetermined condition among the plurality of candidate sets;
in the case where it is determined that there is target data satisfying the first predetermined condition among the plurality of candidate sets, updating facial image data in a first set by using the target data, wherein a first unlock authentication is performed based on the facial image data in the first set, determining whether there is target data satisfying the second predetermined condition among the plurality of candidate sets; and in the case where it is determined that there is target data satisfying the second predetermined condition among the plurality of candidate sets, updating facial image data in the blacklist set by using the target data, wherein the first unlock authentication is prohibited from being performed by using the facial image data in the blacklist set, wherein determining whether there is target data satisfying the first predetermined condition among the plurality of candidate sets and determining whether there is target data satisfying the second predetermined condition among the plurality of candidate sets comprises:

determining respectively whether there are a plurality of facial image data belonging to the same face among the facial image data corresponding to a respective candidate set, and obtaining a determination result; and in the case where it is determined that there are a plurality of facial image data belonging to the same face among the facial image data corresponding to a candidate set, and an amount of the plurality of facial image data exceeds a first threshold, determining that there is target data satisfying the first predetermined condition or target data satisfying the second predetermined condition in the candidate set, wherein the target data is facial image data of the same face that exceeds the first threshold in the candidate set.

16. The data update method according to claim 15, wherein in the case where it is determined that there is target data satisfying the first predetermined condition or target data satisfying the second predetermined condition in a candidate set, the method further comprising:

verifying whether the target data matches the facial image data in the first set or the blacklist set, and in the case where the verification successes, updating the facial image data in the first set or the blacklist set by using the target data.

17. The data update method according to claim 16, wherein verifying whether the target data matches the facial image data in the first set or the blacklist set comprises:

matching the target data with the facial image data in the first set or the blacklist set to obtain a matching result;

in the case where the matching result indicates that the target data is consistent with a timeline change with respect to the facial image data in the first set or the blacklist set, the verification successes; or in the case where the matching result indicates that the target data differs from the facial image data in the first set or the blacklist set in a specific region, the verification successes.

18. The data update method according to claim 17, wherein in the case where the first unlock authentication is a facial image unlock authentication, matching the target data with the facial image data in the first set or the blacklist set comprises:

extracting texture features of a first region on a face from among the target data;

determining, via predetermined texture features of the facial image data in the first set, whether a similarity between the texture features of the first region on a face and the predetermined texture feature in the target data exceeds a second threshold;

in the case where it is determined that the similarity between the texture features of the first region on a face and the predetermined texture feature in the target data exceeds the second threshold, the matching result indicates that the target data is consistent with a timeline change with respect to the facial image data in the first set;

the first region includes at least one of a forehead, an eyelid, a cheek, a mouth corner, a beard, an eye corner, and a glabella or any combination thereof.

19. The data update method according to claim 17, wherein in the case where the first unlock authentication is a facial image unlock authentication, matching the target data with the facial image data in the first set or the blacklist set comprises:

extracting facial image data corresponding to a specific region on a face from among the target data;

matching the facial image data other than data of the specific region in the target data with the facial image data in the first set;

in the case where the matching successes, the matching result indicates that the target data differs from the facial image data in the first set or the blacklist set in the specific region;

the specific region includes at least one of a glasses region and a whisker region.

\* \* \* \* \*